(No Model.)
W. R. BENJAMIN.
PRUNING KNIFE.
No. 568,424.  Patented Sept. 29, 1896.
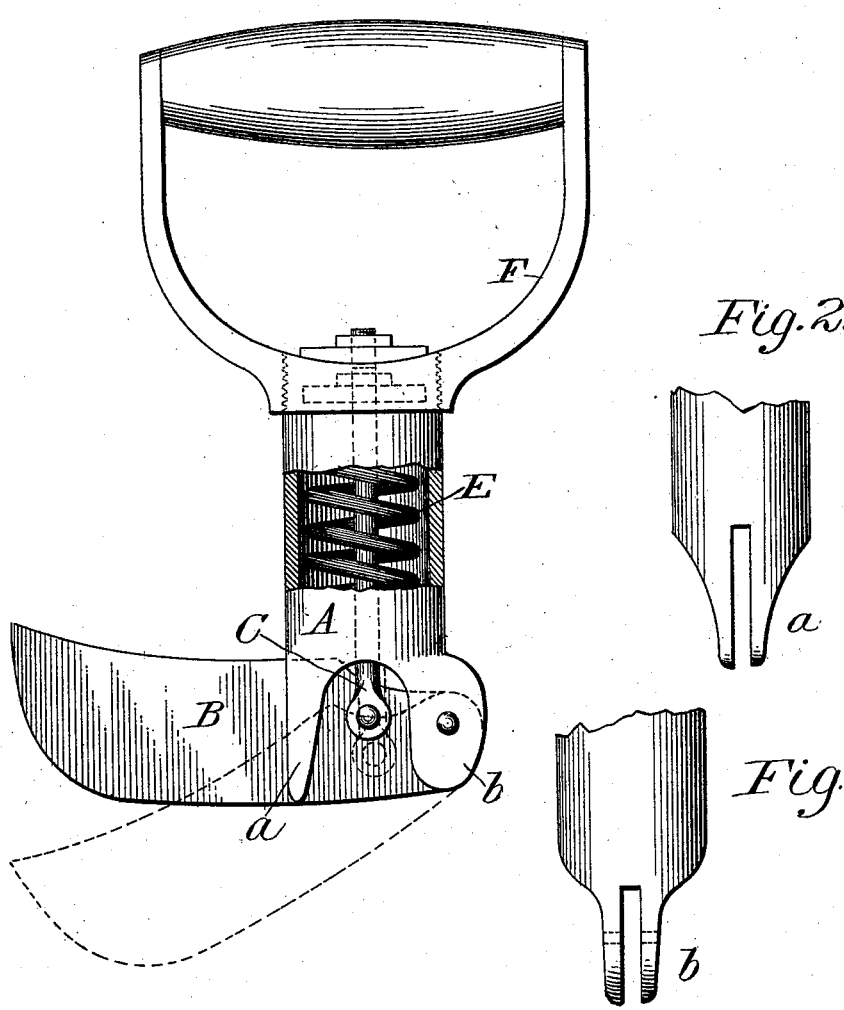

UNITED STATES PATENT OFFICE.

WALTER R. BENJAMIN, OF GRAND TOWER, ILLINOIS.

PRUNING-KNIFE.

SPECIFICATION forming part of Letters Patent No. 568,424, dated September 29, 1896.

Application filed June 4, 1896. Serial No. 594,216. (No model.)

*To all whom it may concern:*

Be it known that I, WALTER R. BENJAMIN, of Grand Tower, county of Jackson, and State of Illinois, have invented a new and Improved Pruning-Knife, of which the following is a clear description.

My invention relates to improvements in pruning-knives.

The objects of my improvement are, first, to so construct a knife that a direct pull upon the handle will cause the blade to make a draw cut and not become fastened in the wood; second, to allow of adjustment according to the strength of operator and size of branches to be cut, and, third, to allow of attaching either long or D-shaped handles. I attain these objects by the device illustrated in the accompanying drawings.

Figure 1 is a plan view of the device partly in section and in connection with a D-shaped handle, the dotted lines showing the position of parts when cutting. Fig. 2 is an edge view of the guides $a\ a$. Fig. 3 is an edge view of the guides $b\ b$.

A represents the main body of pruner, consisting of a hollow shank provided with two sets of guides $a\ a$ and $b\ b$. The blade B is pivoted between the guides $b\ b$, and also passes between the guides $a\ a$ laterally with shank. The rod C is riveted to blade B and passes longitudinally through shank A and spiral spring E, and is provided with a nut and washer or its equivalent for the adjustment of tension of spring.

The shank A can be threaded to fit different handles or can be attached by means of a set-screw.

Having thus described my invention, what I claim as new, and desire to secure by Letters Patent, is—

A pruning-knife consisting of the handle F, the hollow shank A detachably connected thereto, the guides $a\ a$ and $b\ b$ constituting integral extensions of said shank, the rod C spring-supported in the hollow of said shank, the blade B pivoted between the guides $b\ b$ and having also a pivotal connection intermediate of its length with the lower end of the rod C, and the spiral spring E held in the hollow shank and furnishing a yielding support for said rod and blade.

WALTER R. BENJAMIN.

Witnesses:
 CONARD JENNINGS,
 SPENCER H. WEBSTER.